July 7, 1964
G. A. KURHAJEC ETAL
3,140,312
PERCARBOXYLIC ACID PRODUCTION EMPLOYING A
PRETREATED, DEHYDRATED ACID CATION
EXCHANGE RESIN
Filed April 28, 1960
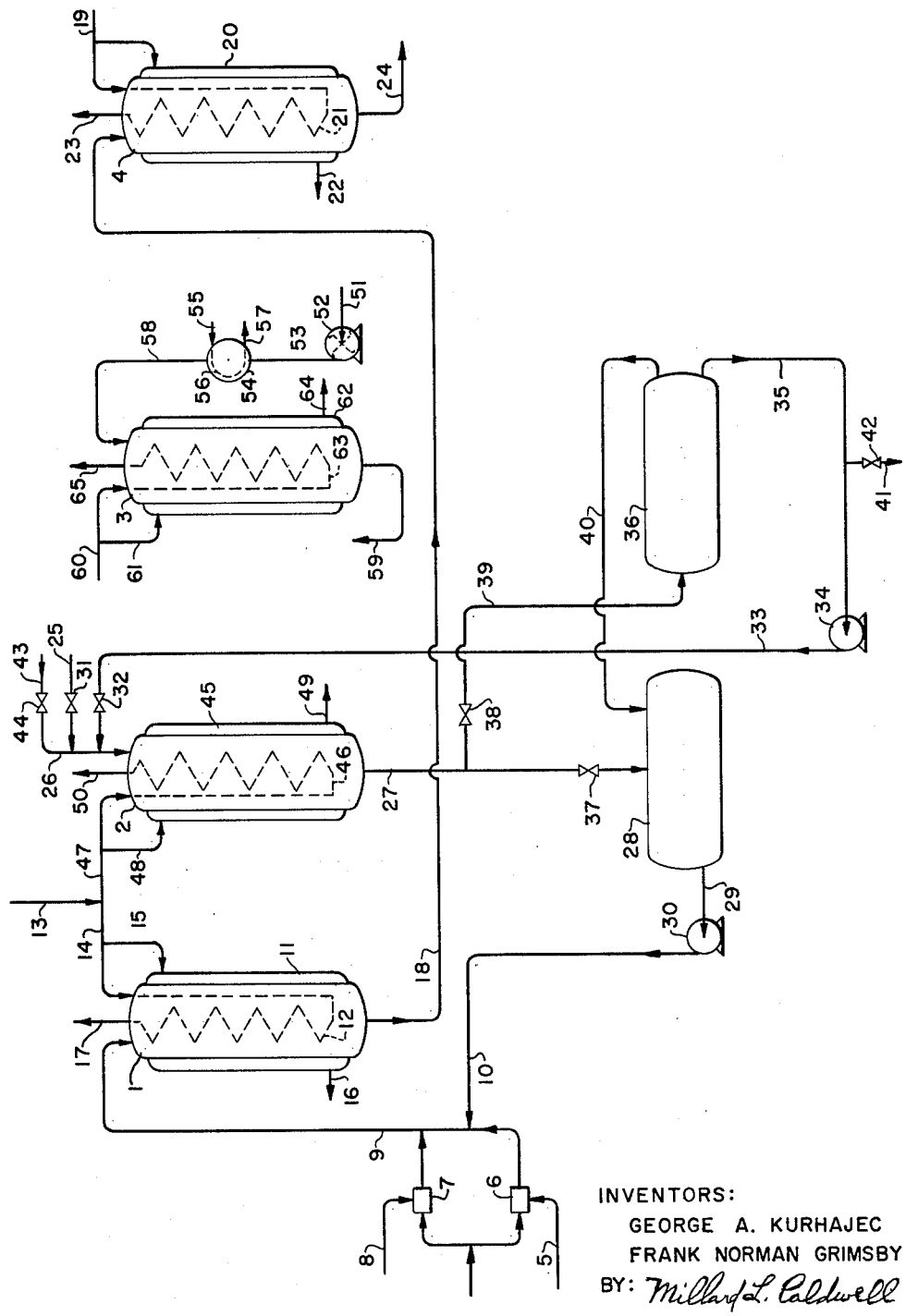
INVENTORS:
GEORGE A. KURHAJEC
FRANK NORMAN GRIMSBY
BY: *Millard L. Caldwell*
THEIR ATTORNEY United States Patent Office 3,140,312
Patented July 7, 1964

3,140,312
PERCARBOXYLIC ACID PRODUCTION EMPLOYING A PRETREATED, DEHYDRATED ACID CATION EXCHANGE RESIN
George A. Kurhajec and Frank Norman Grimsby, Orinda, Calif., assignors to Shell Oil Company, New York, N.Y., a corporation of Delaware
Filed Apr. 28, 1960, Ser. No. 25,436
5 Claims. (Cl. 260—502)

This invention relates to the production of water-soluble carboxylic peracids by reacting carboxylic acids with hydrogen peroxide. It deals with an improved method for carrying out this reaction efficiently and economically and for recovering percarboxylic acid of high quality from reaction products of carboxylic acids and hydrogen peroxide.

Water-soluble peracid production from a carboxylic acid and hydrogen peroxide depends on an equilibrium reaction which can be represented by the equation:

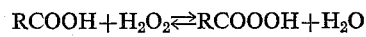

$$RCOOH + H_2O_2 \rightleftharpoons RCOOOH + H_2O$$

wherein R represents hydrogen or an organic radical. For most uses of the carboxylic peracid it is desirable that the hydrogen peroxide content of the product be low enough so that undesirable by-products therefrom will not be produced when the peracid is reacted. It is likewise desirable that the water content of the peracid be as low as possible. A number of methods have been proposed for achieving these objectives. U.S. Patent 2,813,885 of Swern and Parker, for example, recommends reaction in the presence of sufficient sulfuric acid to substantially sequester the water present. This shifts the equilibrium to the right so that high conversions of hydrogen peroxide can be obtained. The water-soluble peracids are then recovered from the sulfuric acid by dilution with a large volume of cold water and it is then necessary to crystallize the peracid from a solvent such as petroleum ether in order to obtain it in a sufficiently water-free condition for ordinary use. In U.S. Patent 2,802,025 a similar method of producing lower carboxylic peracids is described but the product is recovered from the sulfuric acid by vacuum distillation. While this avoids the dilution of the peracid with water, the dangers of explosion inherent in the distillation of peracids makes it a hazardous operation. An alternative procedure is that of U.S. Patent 2,814,641 in which water is removed from the peracid as an azeotrope with an organic liquid boiling from 50° to 130° C. This also requires careful control to avoid explosion hazards and has other disadvantages which are avoided by the process of the present invention. U.S. Patent 2,910,504 claims the use of cation exchange resins as catalysts for the reaction of carboxylic acids with hydrogen peroxide but the method of operation shown is capable of giving only equilibrium mixtures so products contaminated with hydrogen peroxide, water, and starting carboxylic acid are obtained.

In accordance with the invention in one of its advantageous modifications, water-soluble carboxylic peracids are produced by reacting the corresponding carboxylic acid with hydrogen peroxide in intimate contact with sufficient acid ion exchange resin which has been dehydrated so that it will adsorb a substantial part, most preferably essentially all, of the water present including any introduced with either or both of the reactants and that formed in the reaction, the reactants and resin being contacted in the presence of an organic solvent for the reactants and percarboxylic acid product, which solvent has a limited miscibility with water. In this new method of operation, the resin functions simultaneously as a catalyst and desiccating agent with the result that the reaction goes to essential completion and yields peracid which can be anhydrous or of any desired low water content. By the use of the indicated special type of organic solvent with the dehydrated ion exchange resin, not only is the reaction itself improved but also the solvent serves the added function of diluting the product below detonatable concentrations. The result is an efficient and economical process which is simple and safe to operate. It is also a special object of the invention in one of its preferred modifications to provide an economical method for treating acid ion exchange resin for use in the new process to make it a more efficient catalyst with which high conversions of hydrogen peroxide to carboxylic peracid can be obtained with minimized peroxide loss through decomposition.

The invention can be carried out in a variety of advantageous ways. The attached drawing shows diagrammatically one especially useful method of continuous operation according to the new process. In the drawing the apparatus is not drawn to scale and auxiliary equipment has been omitted in the interest of simplicity as has also some of the pipe lines used at other stages of operation than that illustrated but whose arrangement will be obvious to those skilled in the art.

The method of the drawing illustrates the use of four reactors which are rotated in turn through the sequence: finishing reaction, shown as carried out in reactor 4, main reaction in reactor 1, elution of acid ion exchange resin in reactor 2, and regeneration of the acid ion exchange resin in reactor 3. It will be apparent that all these operations can be conducted successively with only a single reactor or that two, three, five, six or more reactors can be similarly used instead of the four in the drawing.

Line 5 is a supply line for feeding the carboxylic acid which is to be converted to peracid from a source, not shown, to one cylinder, 6, of a proportioning pump into the other cylinder, 7, of which, hydrogen peroxide is fed by line 8. The carboxylic acid is mixed in line 9 with an organic solvent, more fully described hereinafter, introduced by line 10. The mixture of carboxylic acid and solvent is then mixed with hydrogen peroxide in controlled proportions and passed to reactor 1. Reactor 1 is provided with a bed of cation exchange resin in acid form. It is also equipped with temperature control means shown as an external jacket 11 and an internal coil 12. Cooling water is fed by lines 13, 14 and 15 to the external jacket 11 and is taken off by line 16 while line 14 also supplies the internal coil with cooling water which is withdrawn from the reactor by line 17. The cation exchange resin in the reactor is one which has been dehydrated so that it acts as a desiccant and adsorbs at least a substantial part of the water present in the reaction mixture in addition to catalyzing the oxidation of the carboxylic acid to peracid by the hydrogen peroxide. The rate of passage of the reaction mixture through the bed of acid resin is controlled to provide sufficient contact time with the resin to insure substantial completion of the desired reaction, most preferably the residence time is such that substantially complete conversion of the hydrogen peroxide takes place. Reacted mixture is withdrawn from the bottom of reactor 1 by line 18.

The reaction of any remaining reactants is completed in reactor 4 where the effluent from reactor 1 is contacted with acid cation exchange resin which has been more recently dehydrated and has a lower percentage of its water absorption capacity taken up so that more thorough removal of water from the mixture is obtained. Complete peroxide conversion to an anhydrous peracid is thus assured. Temperature control in reactor 4 is achieved by feeding cooling water from line 19 to jacket 20 and coil 21, the water being removed by lines 22 and 23 respectively. The carboxylic peracid product is withdrawn from the system by line 24 as a solution in the organic solvent.

Continued flow of reaction mixture through the cation exchange resin bed of reactor 1 results in a gradual decrease in the water adsorption capacity of the resin with resulting increase in the water content of the reactor effluent. When the water adsorption capacity of the resin becomes too low, the feed of carboxylic acid, hydrogen peroxide and solution from line 10 is diverted, by a line not shown, from reactor 1 to reactor 4. The reactor containing the most recently dehydrated cation exchange resin, in the present instance reactor 3, then takes the place of reactor 4 as the finishing reactor. To this end the effluent from the bottom of reactor 4 is conducted by a line not shown to the top of reactor 3 from the bottom of which the product peracid solution is withdrawn.

While reactor 1 is being used as the main reactor, reactor 2, which had been the main reactor in the immediately preceding cycle of operation, is eluted with an organic solvent for the water soluble carboxylic peracid being produced, this solvent being supplied by lines 25 and 26 from a source not shown. The organic solvent used is one which is incompletely miscible with water, preferably a solvent having a solubility in water not greater than 10%, more desirably not greater than 5%, and preferably also having a solubility for water not greater than 10%, more desirably not greater than 5%. The chosen solvent passes over the wet resin extracting the carboxylic acid and corresponding peracid thereon and is taken off by line 27 to tank 28.

The solution of carboxylic acid and peracid in organic solvent in tank 28 is withdrawn by line 29 and passed by pump 30 to line 10 where it is mixed with the carboxylic acid feed to the system in line 9 and then with the hydrogen peroxide as previously described. In this way the solvent serves the additional function of recovering the carboxylic acid and peracid adsorbed on the resin and returning these acids to the reaction mixture without detrimental contamination of the product with water. The reaction mixture is also diluted by the solvent to below detonation concentration so that safe operation is insured.

After eluting carboxylic acid and peracid from the resin with the organic solvent, the valve 31 in line 25 is closed and valve 32 in line 33 is opened. Line 33 is connected via pump 34 and line 35 with tank 36 containing water from a previous elution operation. This water which flows via line 26 to the cation exchange resin bed from which it displaces the organic solvent used for the above described elution of carboxylic acid and peracid. The water, together with the organic solvent displaced from the resin, is removed from the reactor by line 27, valve 37 therein being closed and valve 38 in branch line 39 being open so that the mixture flows to tank 36 in which the organic solvent separates from the water. When the organic solvent has a specific gravity less than one it will separate as an upper layer which is taken off by line 40 and conducted to tank 28 from which it is fed to the reaction as previously explained. The lower aqueous layer in tank 36 is recirculated through the resin bed until the removal of organic solvent from the resin has been substantially completed. When the organic solvent used is one which has a specific gravity greater than one, the relationship of the phases which separate in tank 36 will be reversed and the draw off lines will be rearranged accordingly. After removal of the organic solvent from the resin all or a portion of the water is removed from the system by line 41, valve 42 being opened for this purpose. A final wash with fresh water supplied by lines 43, valve 44 and line 26 is preferably used to complete the elution. This water is water substantially free from cations reactive with the cation exchange resin and preferably is deionized water. After the final water wash the water is accumulated in tank 36 for use in elution of the resin in reactor 1 to which it is fed in the succeeding elution cycle by a line not shown connecting pump 34 with reactor 1. During the elution, the resin in reactor 2 can, if desired, be cooled by water fed from line 13 to the jacket 45 and internal coil 46 via lines 47 and 48 and withdrawn by lines 49 and 50.

Simultaneously with the foregoing operations in reactors 1, 2 and 4, the acid cation exchange resin in reactor 3, which had been eluted in the preceding cycle of operation in the same way as the above-described elution of the bed in reactor 2, is dehydrated by heating and passing air through the resin bed. Air from line 51 is passed by blower 52 through line 53 to preheater 54 in which it is heated by steam or other suitable heating medium supplied by line 55 to an internal coil 56 and withdrawn by line 57. The heated air passes by line 58 to reactor 3 and after contact with the resin bed passes out by line 59. During drying of the resin it is heated by passing a suitable medium, such as warm water, steam or hot oil, supplied by lines 60 and 61, through jacket 62 and internal coil 63, the heating medium being removed from reactor by lines 64 and 65. After removal of the desired amount of water from the resin, preferably all the adsorbed water, reactor 3 can become the finishing reactor in place of reactor 4 which will then be the main reactor while the resin of reactor 1 is being eluted and the eluted resin of reactor 2 is being dried.

As previously indicated, a special feature of the invention is the provision of a particularly advantageous method for treating acid ion exchange resin for initial use in the new process so that hydrogen peroxide loss through decomposition in contact therewith is minimized without impairing the effectiveness of the resin as a catalyst for percarboxylic acid production. In one method of carrying out this modification of the invention, the fresh acid ion exchange resin to be used in the process is thoroughly washed with a peroxygen-containing solution until the hydrogen peroxide decomposition loss in contact with the resin is substantially reduced. While dilute hydrogen peroxide can be used for this wash, it is more advantageous to use a peroxygen-containing solution from the process itself. Especially useful for this treatment is the aqueous phase withdrawn by line 41 in the modification shown in the drawing. Sufficient quantities of this aqueous phase can be accumulated in a tank not shown and used in the preparation of the beds of newly charged resin required from time to time for replacement of the resin in reactors 1, 2, 3 and 4. The peroxygen content of this eventually discarded aqueous phase can in this way be utilized so as to eliminate the hydrogen peroxide consumption in the initial preparation of new catalyst resin for the process. The washing of the resin can be carried out in the reactor in which it is to be used or in another vessel from which the prepared resin can be charged to the reactor. A substantial saving of hydrogen peroxide in the process through reduction of decomposition losses is realized as a result of this pretreatment of the acid resin catalyst.

After the pretreatment of the resin with peroxygen-containing solution it is usually desirable to wash the resin with deionized water to insure removal of peroxygen compounds before drying the resin as previously described to make it an effective water adsorbent.

The process can be varied in still other ways. For example, it is sometimes more advantageous to feed the organic solvent supplied to the reaction by line 10, at one or more points in the reactor as well as with the carboxylic acid feed to the system. This facilitates control of the concentration of peroxy materials and makes it easier to avoid detonatable phases. As another modification of the process, one can operate without a finishing reactor. This will be satisfactory when production of anhydrous carboxylic peracid is not required or for anhydrous peracid at lower throughput rates but a special feature of the invention is the more efficient method of anhydrous peracid production by reaction in a plurality of stages using an acid form of cation exchange resin of lower water content in the last stage than is used in the earlier stage or stages of the reaction of the carboxylic acid and hydrogen peroxide. Instead of the downward flow of reactants and regenerating agents through the cation exchange resin beds as illustrated in the drawing, one can successfully operate with one or more of these flows in the reverse direction. Indeed it is not essential to use the cation exchange resin in the form of a bed through which the liquids are flowed since one can operate with the resin suspended in the liquid by suitable agitation or other means so that the required intimate contact between liquid and acid resin is achieved. However, a product of low water content is most readily achieved by last stage fixed bed continuous operation otherwise many more stages of reaction are required if a completely anhydrous product is desired. Still other variations can be made in the process of the invention but whatever the procedure chosen for applying the new method of reaction, it is essential that the carboxylic acid which is to be oxidized to peracid and the hydrogen peroxide used to effect that oxidation be contacted with an arid form of a cation exchange resin which has a water content sufficiently low to be an adsorbent of water from the reaction mixture there being present an organic solvent for the reactants and peracid product which solvent has a limited miscibility with water such that it forms a heterogeneous mixture comprising an aqueous phase and a separate organic solvent phase upon elution of resin with water.

The exact conditions of temperature, time of contact and proportions of reactants, cation exchange resin and organic solvent which it will be most advantageous to use will depend somewhat upon the particular carboxylic acid which is being oxidized to peracid and upon the concentration of the hydrogen peroxide chosen as oxidizing agent. Generally it is preferred to use hydrogen peroxide having a concentration of at least 25% wt. for the reaction. However, aqueous hydrogen peroxide solutions of lower concentration can be used although it will be necessary to employ more dehydrated cation exchange resin therewith in order to obtain carboxylic peracid product of the same low water content. One can readily and economically produce anhydrous carboxylic peracid when using aqueous hydrogen peroxide of about 30% to about 70% concentration. Hydrogen peroxide of still higher concentration is also usable in the process.

The reaction can be carried out at temperatures of about 10° to about 90° C. keeping in mind the fact that detonation hazard is a function of temperature as well as composition. As a general rule the best results are obtained when using temperatures below about 60° C. Most preferably temperatures of the order of about 15° to about 30° C. are maintained in the reaction mixture, lower temperatures being less desirable because the reaction rate is lower while the loss of hydrogen peroxide increases as the temperature increases materially above 30° C.

Most advantageously the starting carboxylic acid and hydrogen peroxide are used in about stoichiometric proportions so that on completion of the reaction the carboxylic peracid product will be essentially free from either of these compounds. However, there may be circumstances in which a certain amount of one or both of the reactants is not detrimental in the carboxylic peracid product. In such cases the proportions of carboxylic acid to hydrogen peroxide in the reaction mixture can be varied widely, mole ratios of about 3:1 to about 1:3, for example, being one suitable range. When using a stoichiometric excess of one or the other of the reactants it will usually be preferable to carry the reaction to completion with respect to the reactant in smaller proportion in the mixture. Reaction times of the order of about 0.5 to about 15 hours are ordinarily sufficient for adequate reaction which need not be complete reaction of either reactant. As a general rule a reaction time of about 5 to 60 minutes will be advantageous.

As previously indicated an essential function of the acid cation exchange resin used in the new process is the adsorption of at least a substantial amount of water from the reaction mixture so that the equilibrium is shifted toward higher conversion to carboxylic peracid. Thus the amount of cation exchange resin which is will be desirable to use will depend upon its water adsorption capacity. As a general rule the amount of dehydrated resin employed will be in the range of about 10% to about 100% by weight of the carboxylic acid fed to the reaction although higher proportions can be used and, especially when using the resin in the form of a stationary bed through which the reaction mixture is passed, amounts of resin in contact with the acid can be of the order of about 1000% or higher.

The amount of organic solvent for the reactants and carboxylic acid product which should be used in the process can also be varied. The minimum which is desirable is that required to dilute the reaction mixture below detonatable concentrations but a higher proportion is generally preferable. Amounts in the general range of about 0.5 to about 10 pounds per pound of carboxylic acid fed are normally useful and amounts of the order of about 1 to about 4 pounds per pound of carboxylic acid are usually more advantageous, but for applications of the peracid in which an especially dilute solution is desirable amounts of solvent greater than 10 pounds per pound of carboxylic acid may be conveniently employed.

The process can be applied in the production of any water-soluble carboxylic peracid, i.e., any carboxylic peracid having a solubility in water of at least 2 grams per 100 grams at ca. 15° C. Examples of peracids which can be successfully made are performic, peracetic, perpropionic, perbutyric, perisobutyric, perpivalic, permonochloracetic, pertrichloracetic, pertrifluoroacetic, and like acids. Especially preferred starting carboxylic acids for use in the process are the unsubstituted aliphatic saturated acids of 1 to four carbon atoms per molecule. The lower alkanoic acids, and their halogen substitution products, particularly the fluoro, chloro and bromocarboxylic acids are especially useful starting acids. The process can, however, be successfully applied to the production of carboxylic peracids from unsaturated acids although there may be simultaneous reaction at the unsaturated linkage which should be taken into account when calculating the amount of hydrogen peroxide which is to be used in the process. Acrylic acid is a typical unsaturated carboxylic acid which can be used in this way. Alicyclic acids such as cyclohexane carboxylic acid and aromatic acids such as benzoic or phthalic acids are other types of starting carboxylic acids which can be converted to the corresponding carboxylic peracids by the process of the invention.

There are a large number of known cation exchange resins which can be successfully used as the combined catalyst and water adsorption agent in the process of the invention. Especially suitable because of their ready availability and resistance to peroxide attack are the sulfonated styrene-divinylbenzene copolymer resins such as "Dowex 50" and "Amberlite IR-120". U.S. Patent 2,366,007 describes other sulfonated polymers which can be similarly used. Other cation-exchange resins having functional acidic groups such as the sulfonic ($-SO_3H$), carboxylic (—COOH), phosphonic (—PO$_3$H$_2$), phosphonous (—PO$_2$H$_2$), sulfuric (—SO$_4$H) and like acid groups or combinations of two or more such groups, directly attached to the carbon structure of the resin such as are described in U.S. Patent 2,910,504 are useful in the process. These resins can be made with different degrees of water adsorption capacity depending upon the degree of cross linking of the polymer molecules. Increased cross linking decreases the water adsorption capacity of the dehydrated resin but also increases its resistance to peroxide attack. It is desirable to use a cation exchange resin cross linked sufficiently to have a reasonable life under the reaction conditions but not so great as to reduce excessively the water adsorption capacity. As a rule, resins having a water adsorption capacity of the order of about 10 to about 1000 most preferably about 50 to about 300 grams of water per hundred grams of dehydrated resin are suitable. The water adsorption capacity of the resin can be supplemented in the process of the invention by admixing with the resin one or more inert porous materials which take up water, for example, adsorptive alumina, silica gel, pumice, or the like. The cation exchange resin can, for example, be supported on such material in order to insure its uniform distribution throughout the catalyst bed. Where reference is made to the cation exchange resin in the appended claims, these mixtures are intended to be included as well as the acid form of the resin used alone. Resin of about 10 to 100 mesh size is suitable for use in the preferred modification of the new process in which the resin is employed as a stationary bed, and resin of about 20 to about 50 mesh is preferred for this use, but resin of finer and/or coarser particle size can be used in the invention.

The cation exchange resin is preferably dried to remove as much water as possible before it is used in the process because the greatest water adsorption capacity is obtained in this way with resulting greatest economy since the period of operation between regenerations is longer the greater the water adsorption capacity of the resin. It is not essential to the success of the invention that the adsorbed water be removed completely from the resin before it is used initially or reused in the new process. It is only necessary to remove enough of the adsorbed water to make the resin effective in reducing the water content of the reaction mixture sufficiently to improve the conversion to carboxylic peracid in the reaction. Various methods of water removal can be used successfully. Instead of drying with heated air as previously described, which drying is advantageously carried out at a temperature between about 100° and about 140° C. in order to avoid heat damage to the resin, one can use heating under vacuum or other drying methods.

As previously indicated, the organic solvent for the reactants and carboxylic peracid product whose use in the reaction is an essential feature of the new process is one which is incompletely miscible with water and relatively inert under the operation conditions chosen. Either polar or non-polar solvents of this kind can be employed. Representative examples of suitable solvents are: hydrocarbons, for instance, benzene, toluene, petroleum ether, etc.; halohydrocarbons, e.g., chloroform, carbon tetrachloride, dichloroethane, and the like; ethers such as diethyl ether, methyl isopropyl ether, methyl tertiary butyl ether and analogous ethers; and esters of which ethyl acetate, isopropyl formate and ethyl isobutyrate are typical. Also usable but somewhat less desirable because they are more subject to reaction with hydrogen peroxide are ketones such as methyl isobutyl ketone, diisobutyl ketone and ethyl isopropyl ketone. Mixtures of solvents can be used instead of a single organic solvent. A mixture of methyl tert-butyl ether and benzene, for example, is more advantageous than this ether alone under certain conditions. Where the solvent is to be subsequently removed completely or in part from the carboxylic peracid product it is advantageous to use organic solvents lower boiling than the peracid, preferably solvents boiling in the range of about 50° to about 130° C. As a general rule it is not necessary to remove the organic solvent from the carboxylic peracid in order to use the latter and since the solvent serves to reduce the detonation hazard in shipment, storage and use of the peracid it is preferably not removed so solvents of higher boiling point can be used successfully in the new process.

The following examples illustrate methods of applying the process of the invention and show some of its advantages over prior methods of carboxylic peracid production.

*Example I*

This example illustrates production of peracetic acid with an assemblage of apparatus of the type shown in the drawing. The four reactors are each 1500 gallon aluminum tanks of 6 ft. 6 inches diameter charged with a bed of 10,000 pounds of Dowex 50X12 cation exchange resin of 20–50 mesh resin weighing 50 lbs. per cu. ft.

Before the start of operations the resin beds are washed first with dilute aqueous hydrochloric acid solution to insure that all the sulfonic groups will be in free acid form and then washed first with deionized water and then with dilute, e.g., about 6%, aqueous hydrogen peroxide solution in order to reduce decomposition of hydrogen peroxide and peracetic acid during subsequent use of the resin. The resin is then dried by passing heated air through the beds until the resin has a capacity for water adsorption of 0.8 lbs. per pound of dry resin.

The reaction is carried out by pumping glacial acetic acid and 45% wt. aqueous hydrogen peroxide at the rates of 1.3 and 4.2 gallons per minute to the first reactor together with 2.5 gallons per minute of the methyl tertiary butyl ether solution of acetic acid and peracetic acid obtained from elution of reactor number 2, the mole ratio of acetic acid to H$_2$O$_2$ in the reaction mixture being 1.25:1. The reaction temperature in reactor 1 and finishing reactor 4 is maintained at about 25° C. After eight hours operation the feed is switched to reactor 4 and reactor 3 becomes the finishing reactor. The resin in reactor 1 is then eluted by washing first with methyl tert-butyl ether and then with deionizing water and finally redried by air preheated to 160° F. while heating the bed with steam in the internal coil. The product obtained is an anhydrous solution containing 42% wt. peracetic acid, 8% acetic acid and 50% wt. methyl tert-butyl ether.

*Example II*

There was placed in a 500 cc. flask, fitted with a stirrer, thermometer and dropping funnel, 45 g. of washed and dried Dowex 50X12 resin with 54 g. acetic acid (glacial) and 83 g. chloroform. Thirty (30) grams of 50% hydrogen peroxide was added slowly maintaining a temperature below 25° C. (about 20 min. was required). After a total reaction time of about 90 minutes the resin was removed by filtration. The resulting filtrate analyzed to contain 39% w. peracetic acid.

*Example III*

A series of carboxylic peracids was made using a four-neck, one-liter flask, fitted with a dropping funnel, thermometer, reflux condenser and stirrer. The flask was maintained in a 25° C. water bath during the reactions. For each test the flask was charged successively with "Dowex" 50–X12 resin (a sulfonated styrene-divinyl benzene copolymer sold by Dow Chemical Co.) in acid form which had been washed and dried as described in Example I, the carboxylic acid which was to be oxidized to percarboxylic acid and chloroform. A 50% solution of hydrogen peroxide in water was then added through the dropping funnel over a short period of time (addition time about two minutes). The reaction mixture was stirred and aliquots were withdrawn at intervals and analyzed, until it was determined that maximum conversion to peracid had been achieved. In all cases conversions of 90% or better were obtained. The following table shows the amounts of materials used in each case and the time required to reach maximum conversion:

| Peracid Produced | Per-propionic acid | Per-butyric acid | Per-isobutyric acid | Per-valeric acid | Per-pivalic acid |
|---|---|---|---|---|---|
| Acid charged | Propionic acid | Butyric acid | Isobutyric acid | Valeric acid | Pivalic acid |
| Weight of Acid charged (grams) | 74 | 88 | 88 | 103.7 | 102 |
| Grams of chloroform used | 425 | 400 | 400 | 375 | 370 |
| Weight of H₂O₂ solution added (grams) | 34 | 34 | 34 | 34 | 34 |
| Time required for maximum conversion (hours) | 2½ | 8⅓ | 13⁴⁄₁₀ | ---------- | 183⅔ |

It will be seen that the process of the invention offers many advantages over prior methods of percarboxylic acid production. By the use of an organic solvent of the special type described in combination with a water adsorptive cation exchange resin in the hydrogen form, not only is the desired reaction of hydrogen peroxide with the starting carboxylic acid improved but also the detonation hazard is reduced and losses of acid and peracid on the resin are avoided since the organic solvent used is also employed for eluting these acids from the resin. In addition the product can be obtained in a more advantageous form substantially free from the corresponding carboxylic acid which is undesirable in many uses of the peracid product. Still another advantage of the new process, as compared with methods which use the corresponding carboxylic acid as the solvent for the peracid, is that the peracid is obtained as a solution in an inert organic solvent which is more readily and economically recovered after use of the peracid product.

We claim as our invention:

1. In a process for producing a water soluble carboxylic peracid by reacting the corresponding carboxylic acid of the group consisting of the lower alkanoic acids and their fluoro, chloro, and bromo-substitution products with hydrogen peroxide in the presence of a resin substantially insoluble in the reaction mixture and containing acidic cation-exchange groups, the improvement of pretreating said cation exchange resin catalyst with a peroxygen-containing solution in the substantial absence of said reactants until the loss of hydrogen peroxide by decomposition in contact with the catalyst is substantially reduced, contacting said reactants with a water adsorptive form of said resin in the presence of a solution of said carboxylic acid and corresponding peracid in an organic solvent for the carboxylic acid and corresponding peracid which solvent has a solubility in water and a solubility for water neither of which is greater than 10% and which is inert under the reaction conditions which has a solubility in water and a solubility for water neither of which is greater than 10% and which is inert under the reaction conditions which solution has been obtained by eluting with said solvent acidic cation-exchange resin directly after use as catalyst and water adsorption agent in the reaction.

2. In a process for producing a water soluble carboxylic peracid by reacting the corresponding carboxylic acid of the group consisting of the lower alkanoic acids and their fluoro, chloro, and bromo-substitution products with hydrogen peroxide in the presence of a resin substantially insoluble in the reaction mixture and containing acidic cation-exchange groups, the improvement which comprises treating a bed of said resin in free acid form with an aqueous peroxide-containing solution, drying the peroxide-treated resin to make it water adsorptive, passing the carboxylic acid and hydrogen peroxide through the bed together with an organic solvent for the carboxylic acid and corresponding peracid which solvent has a solubility in water and a solubility for water neither of which is greater than 10% and which is inert under the reaction conditions until the water adsorptive capacity of the resin is substantially reduced, contacting the resin with said organic solvent in the absence of further added reactants to substantially remove adsorbed carboxylic acid and peracid from the resin, adding the organic solvent so obtained to the reactants in carrying out further reaction, water washing the resin and using peroxygen-containing wash water therefrom for peroxide treatment of a bed of newly charged resin.

3. In a process for producing a carboxylic peracid by reacting the corresponding carboxylic acid of the group consisting of the lower alkanoic acids and their fluoro, chloro, and bromo-substitution products with aqueous hydrogen peroxide in the presence of a cation exchange resin catalyst for the reaction, the improvement of pretreating said cation exchange resin catalyst with a peroxygen-containing solution in the substantial absence of said reactants until the loss of hydrogen peroxide by decomposition in contact with the catalyst is substantially reduced, passing a liquid mixture of said carboxylic acid and hydrogen peroxide together with an organic solvent for said acid and peracid which solvent has a solubility in water and for water which is not greater than 10% and is inert under the reaction conditions through a plurality of beds of said cation exchange resin which have been dried so that they will function as a desiccant and adsorb water present in the reaction mixture in addition to catalyzing the oxidation of said carboxylic acid to peracid by the hydrogen peroxide, the last of the beds of the series being maintained at a higher water adsorption capacity than the preceding resin bed throughout the reaction whereby more complete conversion of peroxide to anhydrous peracid is promoted.

4. A process in accordance with claim 3 wherein an alkanoic acid, hydrogen peroxide and chloroform are passed through a bed of sulfonated copolymer of styrene and divinylbenzene at a rate such that the average contact time of reaction mixture with the resin is about 5 to 60 minutes.

5. A process in accordance with claim 3 wherein perpropionic acid is produced by reacting propionic acid with hydrogen peroxide in the presence of methyl tertiary butyl ether.

References Cited in the file of this patent

UNITED STATES PATENTS

| 1,043,316 | Phillips et al. | Nov. 13, 1958 |
| 2,910,504 | Hawkinson | Oct. 27, 1959 |
| 2,976,265 | Pearce | Mar. 21, 1961 |

OTHER REFERENCES

Phillips et al.: J. Org. Chem., vol. 23, pages 1823–1826.

Nachod et al.: "Jon Exchange Technology," page 274 (1956).